United States Patent
Mam et al.

(10) Patent No.: US 9,171,002 B1
(45) Date of Patent: Oct. 27, 2015

(54) FILE BASED INCREMENTAL BLOCK BACKUP FROM USER MODE

(71) Applicant: EMC Corporation, Hopkinton, MA (US)

(72) Inventors: Neelabh Mam, Bangalore (IN); Kiran Kumar Madiraju Varadaraju, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 193 days.

(21) Appl. No.: 13/924,777

(22) Filed: Jun. 24, 2013

Related U.S. Application Data

(60) Provisional application No. 61/747,326, filed on Dec. 30, 2012.

(51) Int. Cl.
  *G06F 17/00* (2006.01)
  *G06F 17/30* (2006.01)
(52) U.S. Cl.
  CPC ................................ *G06F 17/30091* (2013.01)
(58) Field of Classification Search
  None
  See application file for complete search history.

(56) References Cited

U.S. PATENT DOCUMENTS

| | | | |
|---|---|---|---|
| 7,873,601 B1 * | 1/2011 | Kushwah | 707/654 |
| 7,934,064 B1 * | 4/2011 | Per et al. | 711/161 |
| 8,200,638 B1 * | 6/2012 | Zheng et al. | 707/679 |
| 8,533,189 B2 * | 9/2013 | Ingen et al. | 707/724 |
| 8,650,162 B1 * | 2/2014 | Vaikar et al. | 707/692 |
| 2004/0268068 A1 * | 12/2004 | Curran et al. | 711/162 |
| 2007/0083722 A1 * | 4/2007 | Per et al. | 711/162 |
| 2007/0112895 A1 * | 5/2007 | Ahrens et al. | 707/204 |
| 2009/0006640 A1 * | 1/2009 | Brouwer et al. | 709/231 |
| 2012/0016841 A1 * | 1/2012 | Karonde et al. | 707/641 |
| 2013/0325810 A1 * | 12/2013 | Elder et al. | 707/645 |

* cited by examiner

*Primary Examiner* — Hung Le
(74) *Attorney, Agent, or Firm* — Van Pelt, Yi & James LLP

(57) ABSTRACT

A system for incremental backup comprises a storage device and a processor. The processor is configured to: 1) start fileIO ETW tracking, wherein a file changed block info is tracked in map(s), wherein each of the map(s) tracks writes indicated via a node of a set of nodes; 2) receive request for an incremental backup of one or more files of one or more volumes, wherein the map(s) track changed blocks from writes to the one or more files; 3) halt writes to the one or more files and queue writes to the one or more files after halting; 4) freeze the map(s) of changed blocks; 5) change file IO ETW tracking, wherein the change block info is tracked to a new set of maps; 6) determine changed blocks using the map(s); 7) write changed blocks to a backup volume; and 8) release writes to the one or more files.

16 Claims, 10 Drawing Sheets

FILE BASED INCREMENTAL BLOCK BACKUP FROM USER MODE

CROSS REFERENCE TO OTHER APPLICATIONS

This application claims priority to U.S. Provisional Patent Application No. 61/747,326 entitled BLOCK BASED INCREMENTAL BACKUP FROM USER MODE filed Dec. 30, 2012 which is incorporated herein by reference for all purposes.

BACKGROUND OF THE INVENTION

Block based backup applications bypass the file system and read data directly at the volume level. The advantage of reading data at block level is that, there is no penalty on backup performance when the volume has large number of files. Block based incremental backup is a type of incremental backup, where only those blocks are backed up that have changed since the previous incremental backup. The most efficient method for computing incremental backups at the volume level is by using a volume class filter driver. This filter driver is situated between the file system and the disk class driver. By placing a volume filter between the file system and disk subsystem, the driver is able to identify changed volume blocks in real-time. In Windows, this kind of device driver is called an upper volume device filter driver. As writes are monitored at volume level, the block that was changed is recorded in an in-memory data structure inside the kernel that details the on-volume location of the block which was changed as a result of the incoming write. Three major challenges with the process of implementing and using a filter driver to maintain changed block tracking are: (1) This approach requires the target system to be rebooted for the filter driver to successfully attach to boot volume of the system and this in turn means downtime for a production server which could be hosting mission critical applications and workloads. (2) Some third party volume filter driver can be introduced below our volume filter and could potentially issue writes to the volume. This would interfere with the write interception logic in the upper volume device filter driver. On similar lines a user mode application might directly open a device handle to the underlying disk device and initiate sector level writes. Such IO is directly sent to the disk class driver thereby completely bypassing the volume stack. (3) Cluster shared volumes (CSV) on Windows 8 introduces additional complexities for block level incremental backups by exposing a shared disk containing an NTFS volume that is made accessible for read and write operations by all nodes within a Windows Server Failover Cluster. On non-coordinator CSV nodes there is no concept of volume stack as writes go directly from the CSV file system minifilter driver to disk class driver. A volume class filter cannot be used for tracking all the changed blocks across various nodes.

BRIEF DESCRIPTION OF THE DRAWINGS

Various embodiments of the invention are disclosed in the following detailed description and the accompanying drawings.

DETAILED DESCRIPTION

Figure 1:
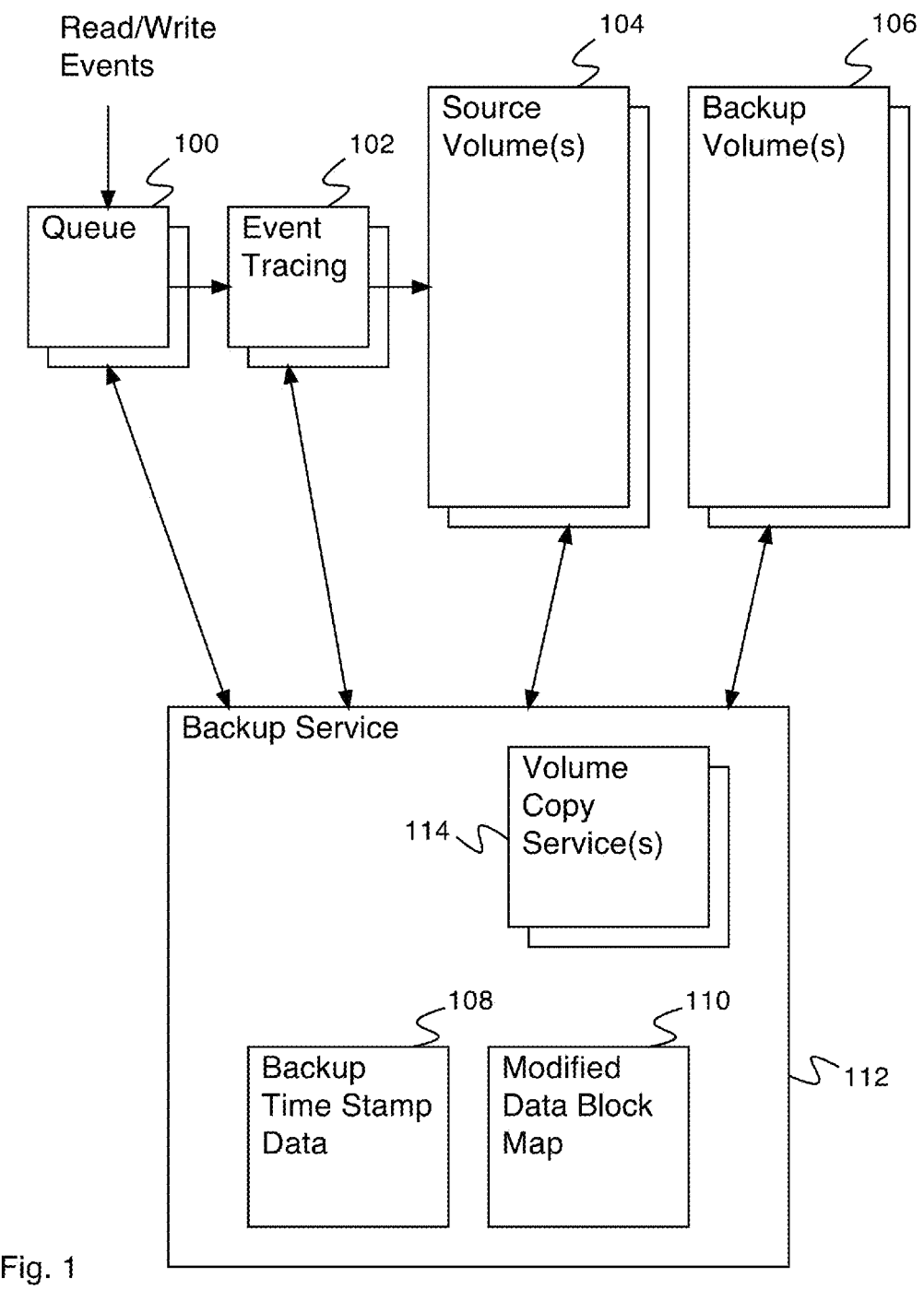
FIG. 1 is a block diagram illustrating an embodiment of a system for block based incremental backup from user mode.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for incremental backup is disclosed. The system comprises a storage device, a processor, and a memory. The storage device comprises one or more volumes. The processor is configured to: 1) start Event Tracing for Windows tracking, wherein a changed block info is tracked in one or more maps, wherein each of the one or more maps tracks writes indicated via a node of a set of nodes; 2) receive request for an incremental backup of a volume of one or more volumes, wherein the one or more maps track changed blocks from writes to the volume; 3) halt writes to the volume and queue writes to the volume after halting; 4) freeze the one or more maps of changed blocks; 5) change Event Tracing for Windows tracking, wherein the change block info is tracked to a new set of maps; 6) determine changed blocks using the one or more maps; 7) write changed blocks to a backup volume; and 8) release writes to the volume. The memory is coupled to the processor and configured to provide the processor with instructions.

A system for incremental backup is disclosed. The system comprises a storage device, a processor, and a memory. The storage device comprises one or more volumes. The processor is configured to: 1) start fileIO Event Tracing for Windows tracking, wherein a file changed block info is tracked in one or more maps, wherein each of the one or more maps tracks writes indicated via a node of a set of nodes; 2) receive request for an incremental backup of one or more files of one or more volumes, wherein the one or more maps track changed blocks from writes to the one or more files; 3) halt writes to the one or more files and queue writes to the one or more files after halting; 4) freeze the one or more maps of changed blocks; 5) change file IO Event Tracing for Windows tracking, wherein the change block info is tracked to a new set of maps; 6) determine changed blocks using the one or more maps; 7) write changed blocks to a backup volume; and 8) release writes to the one or more files. The memory is coupled to the processor and configured to provide the processor with instructions.

This method makes use of a VSS software provider and Event Tracing for Windows (ETW) to create incremental backups from user mode without requiring the use of kernel level volume device filter driver. No reboot/server downtime is required for changed block tracking and additionally, raw disk device writes to the underlying disk of the volume are monitored as well. The proposed method also makes block level backup of CSV volume possible.

FIG. 1 is a block diagram illustrating an embodiment of a system for block based incremental backup from user mode. Source volume(s) 104 comprise one or more source volumes (e.g., disks, disk partitions, virtual disks, etc.) for backup. Incoming read/write events are received by queue 100 and forwarded to event tracing 102 and source volume(s) 104. In some embodiments, queue 100 comprises one or more queues, each queue associated with a single source volume. In some embodiments, event tracing 102 comprises one or more event tracing modules, each event tracing module associated with a single source volume. In some embodiments, event tracing 102 comprises event tracing for Windows™ (ETW). Backup volume(s) 106 comprise one or more volumes, each volume associated with one of source volume(s) 104. In some embodiments, each volume of backup volume(s) 106 comprises a set of backups of the associated source volume 104. In some embodiments, each volume of backup volume(s) 106 comprises a full backup and a set of incremental backups. In some embodiments, each volume of backup volume(s) 106 comprises a virtual hard disk (VHD). In some embodiments, each backup (e.g., each full and incremental backup) is contained in its own VHD. Backup service 112 comprises a backup service for backing up source volume(s) 104 to backup volume(s) 106. In some embodiments, backup service 112 comprises a system for creating full and incremental backups. In some embodiments, backup service 112 comprises a system for block based incremental backup from user mode. Backup service 112 comprises volume copy service(s) 114. Volume copy service(s) 114 comprises one or more volume copy services. A volume copy service comprises a service for copying a volume. In some embodiments, a volume copy service comprises a service for backing up a volume. In some embodiments, a volume copy service comprises a volume shadow copy service (VSS). In various embodiments, volume copy service 114 comprises the same number of volume copy service(s) 114 as source volume(s) 104, a different number of volume copy service(s) 114 from source volume(s) 104, or any other appropriate number of volume copy service(s) 114. Each of source volume(s) 104 is assigned one of volume copy service(s) 114 to perform backup copying. Any given one of volume copy service(s) 114 can be assigned to zero, one, or more than one source volume 104.

Backup service 112 initially receives an indication to create a new backup set associated with a set of source volume(s) 104. In some embodiments, a new backup set comprises a snapshot set. Backup service 112 begins by creating a full backup of the backup set (e.g., of the set of source volume(s) 104). Backup service 112 indicates to queue 100 to halt forwarding of write events to source volume(s) 104 and instead queues the write events. Volume copy service(s) 114 then initiate(s) copying of source volume(s) 104 to backup volume(s) 106. Backup service 112 records the backup time in backup time stamp data 108. In various embodiments, the recorded backup time comprises the time the backup was started, the time the backup was completed, the time of the midpoint of the backup, or any other appropriate time. In some embodiments, the recorded backup time comprises the recorded backup time for each of source volume(s) 104 (e.g., the recorded backup time for each of source volume(s) 104 comprises the same time). When the backup is complete, backup service 112 indicates to queue 100 to forward any queued write events and begin forwarding any new write events.

During use of source volume(s) 104, event tracing 102 reports events associated with source volume(s) 104. Backup service 112 receives events from event tracing 102 and filters data write events. When a data write event is received, backup service 112 determines the data block or blocks of source volume(s) 104 associated with the data write event. The associated data block or blocks are marked as modified in modified data block map 110. Modified data block map 110 serves as a map of data blocks of source volume(s) 104 that have been modified since the most recent incremental backup.

Backup service 112 periodically receives an indication to perform an incremental backup for a backup set. Backup service 112 indicates to queue 100 to halt forwarding of write events to source volume(s) 104 and instead queues the write events. Modified data block map 110 is then used to determine data blocks of source volume(s) 104 that have been modified since the most recent backup, and volume copy service(s) 114 coordinates copying of the modified blocks of source volume(s) 104 to backup volume(s) 106. Backup service 112 records the backup time in backup time stamp data 108. In various embodiments, the recorded backup time comprises the time the backup was started, the time the backup was completed, the time of the midpoint of the backup, or any other appropriate time. When the backup is complete, backup service 112 makes an indication to queue 100 to forward any queued write events and begin forwarding any new write events. Modified data block map 110 is then cleared so a new map of modified data blocks can be built.

In some embodiments, one of source volume(s) 104 comprises a dummy source volume (e.g., a source volume containing no data). In some embodiments, one of volume copy service(s) 114 comprises a dummy volume copy service provider (e.g., a volume copy service that is only associated with a dummy source volume), and is associated with a dummy source volume of source volume(s) 104. In some embodiments, when a dummy volume copy service provider acts to create a copy of a dummy volume, instead of creating a copy, it acts to halt updates to data block map 110. In some embodiments, when a VSS requestor associates the dummy provider with a dummy volume, it is effectively requesting a VSS state machine to engage the provider and make it part of the subsequent VSS snapshot process by invoking its registered callback routines at the defined times. All VSS software providers expose a uniform interface which the VSS subsystem calls into during the snapshot creation process. With the dummy provider registered to participate in the snapshot, the requestor initiates the actual snapshot. Now while the VSS subsystem transitions its state machine in order to create the software snapshots for all the member volumes in the set, it calls the interface callbacks of all registered providers at various points during its state transitions. For example, very early in the state machine the VSS subsystem invokes the IsVolumeSupported method of all registered providers, sequentially one after the other, and gives them an opportunity to claim support of the volume which the requestor marked them against initially. Similarly, further ahead in the VSS state machine, when the actual software snapshots are in the process of being committed, VSS subsystem invokes the respective CommitSnapshots method of all the providers sequentially one after the other. This method has the additional property of being invoked by VSS subsystem at the time when writes to all the volumes registered in the set are frozen. The dummy provider's CommitSnapshot method, instead of creating any logical software snapshot of the dummy volume, freezes and stops updating the currently active change block map. Halting updates to data block map 110 ensures that the time stored in backup time stamp data 108 applies to all of source volume(s) 104.

Figure 2:
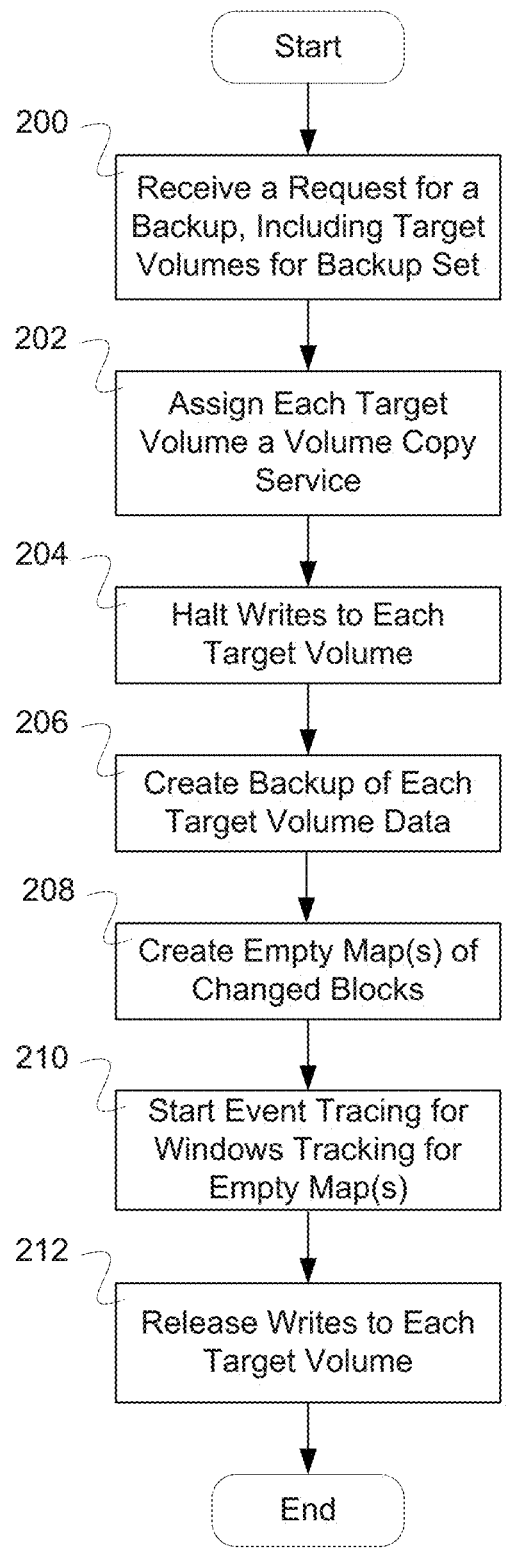
FIG. 2 is a flow diagram illustrating an embodiment of a process for creating a full backup.

FIG. 2 is a flow diagram illustrating an embodiment of a process for creating a full backup. In some embodiments, the process of FIG. 2 is executed by backup service 112 of FIG. 1. In the example shown, in 200, a request for a backup is received, including a set of target volumes for the backup set. In 202, each target volume is assigned a volume copy service. In 204, writes to each target volume is halted. In some embodiments, writes to each target volume is queued. In some embodiments, writes to each target volume is halted simultaneously. In some embodiments, writes to each target volume is halted with an effective time different from the time the command to halt writes is issued. In some embodiments, writes to each target volume is are halted sequentially but with identical effective times. In 206, a backup of each target volume data is created. In 208, empty map(s) of changed blocks is/are created. In 210, Event Tracing for Windows tracking is started for empty map(s). For example, for each node in a system (e.g., a local node, one or more remote node, etc.), a map tracks changed blocks for a given target volume by monitoring writes indicated to the given target volume by the node. In 210, writes to each target volumes are released. In some embodiments, queued writes to each target volume are released and writes are tracked in the map(s) of changed blocks that come to each target volume from one or more nodes.

Figure 3:
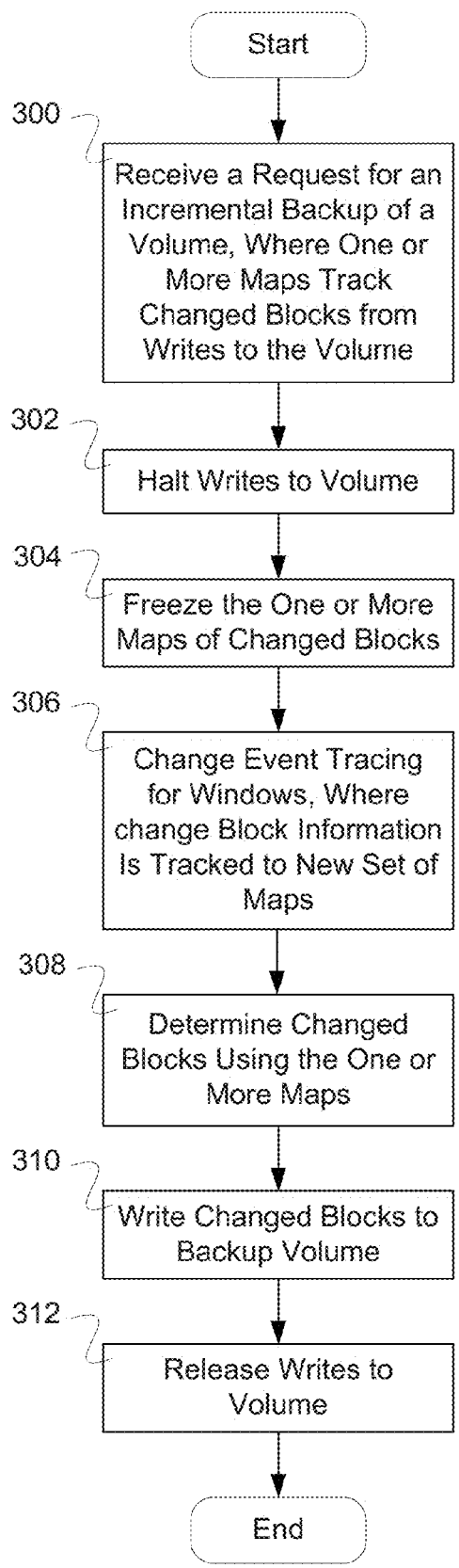
FIG. 3 is a flow diagram illustrating an embodiment of a process for creating an incremental backup.

FIG. 3 is a flow diagram illustrating an embodiment of a process for creating an incremental backup. In some embodiments, the process of FIG. 3 is executed by backup service 112 of FIG. 1. In the example shown, in 300, a request for an incremental backup of a volume is received, where one or more maps track writes to the volume. In some embodiments, the volume is one volume of a plurality of volumes. In some embodiments, each map monitors changed blocks due to writes from a node of the system (e.g., a local node, a remote node, etc.). In 302, writes to the volume are halted. In some embodiments, writes to the volume are queued. In 304, the one or more maps of changed blocks are frozen. In 306, Event Tracing for Windows tracking is changed, where the change block info is tracked to a new set of maps. In 308, changed blocks are determined using the one or more maps. For example, the changed blocks since the last backup from all of the one or more maps are aggregated and are used to determine a master map. In some embodiments, changed blocks are determined from a modified data block map. In 310, changed blocks are written to a backup volume. In 312, writes to the volume are released. In some embodiments, queued writes to the target volumes are released.

In some embodiments, in this scheme a VHD (Virtual hard disk) file is used as the container for incremental backups. The first full backup is contained in a dynamically expanding parent VHD while subsequent incrementals go in differencing child VHDs which are linked to the underlying parent thereby forming a volume level incremental backup chain. The proposed solution creates a snapshot set which consists of: one or more target volume(s) (volumes for which we need to maintain incremental backups) and one small dummy VHD based volume. The default system VSS provider is marked as the one responsible for taking snapshot of the actual target volume(s) and a dummy VSS software provider (Win32 service application) is marked as the one responsible for taking the snapshot of the dummy volume. This is done so that our dummy VSS software provider hooks into the VSS snapshot scheme at the defined time when the writes to the volume are frozen. This happens inside the CommitSnapshot( ) method of our VSS software provider. The base parent backup VHD is created out of the first snapshot generated for the volume for which the default system provider was marked as the one responsible for taking the snap. While the first snapshot is being generated, we start DiskIo class ETW tracing from inside the CommitSnapshots method of our dummy VSS provider. Real time consumption of the DiskIO class events from inside CommitSnapshot method of our fake VSS provider triggers changed block tracking on the entire disk that hosts the partition for which we need to create incremental volume backup. Once ETW tracing starts, we start updating the data change block map. This map records the locations and offsets of all subsequent writes happening to the volume(s) after the first snapshot is taken. Writes which fall outside the target partition(s) boundaries are excluded from the change block tracking.

A request from a user application to access a file and the corresponding completion of that request back to the user application travels through a stack of multiple components. In the Windows IO system, IO operations are tracked by an entity called an JO Request Packet (IRP). A user-initiated IO operation is turned into an IRP when it enters the JO Manager. As an IRP traverses a chain of components, each component performs necessary tasks to process the request, updates the IRP and passes it on, if necessary, to the component that will handle the request next. When all requirements of the IO request are satisfied (in a simple case, a requested block of a file is retrieved from a disk), registered completion routines are called to perform any additional processing of the data, and the requested data is returned to the user application. Event Tracing for Windows (ETW) is a general-purpose, high-speed tracing facility provided by the operating system. Using a buffering and logging mechanism implemented in the kernel, ETW provides a tracing mechanism for events raised by both user-mode applications and kernel-mode device drivers. Additionally, ETW gives you the ability to enable and disable logging dynamically, making it easy to perform detailed tracing in production environments without requiring reboots or application restarts. The logging mechanism uses per-processor buffers that are written to disk by an asynchronous writer thread. This allows large-scale server applications to write events with minimum disturbance. DiskIO class ETW events are raised by Disk class driver which sits at the bottom of the windows storage stack just above the HBA port driver. Any user mode application can consume ETW events (for example diskmon from sysinternals). ETW event logging can either be file based or the events can be consumed in real time by applications. We use real time event consumption. Once the DiskIO ETW starts we filter the events for our target volume's physical disk and maintain the changed blocks in an in memory data structure just like what the volume filter driver does, inside kernel mode for changed block tracking. Furthermore, Disk IO class events are logged at the IO completion time. This ensures that the CBT done via ETW is correct with respect to the writes actually happening on the disk. Volume filter drivers usually record writes to volume when the IRP_MJ_WRITE IRP is travelling down the stack rather than from inside its completion routine as registering a successful write from inside the completion routine requires the CBT bitmap to be allocated from non-paged pool (Critical resource) and as such the incoming write could fail anywhere once it goes beyond the CBT volume filter driver.

In some embodiments, in addition to the incremental volume-level backups consuming DiskIO class ETW events for changed block tracking purposes, the ETW framework is also capable of triggering events on a per file basis using FileIo class. So the method can be extended to file-level incremental backups.

From a program's perspective, operations such as opening, reading, or writing files are the way to access the contents on the disk. Due to optimizations such as caching and prefetching, not all file IO requests result in immediate disk access. Furthermore, file contents may be scattered across disks, and certain disk devices support mirroring and striping, and so on. For such cases, reading one block of data from a file translates into multiple accesses to one or more disks. The events for file and disk access account for file IO start, file IO completion, disk access start, disk access end, split JO, driver activities and file (name to unique key) maps.

A request from a user application to access a file and the corresponding completion of that request back to the user application travels through a stack of multiple components. In the Windows IO system, IO operations are tracked by an entity called an IO Request Packet (IRP). A user-initiated IO operation is turned into an IRP when it enters the IO Manager. As an IRP traverses a chain of components, each component performs necessary tasks to process the request, updates the IRP and passes it on, if necessary, to the component that will handle the request next. When all requirements of the IO request are satisfied (in a simple case, a requested block of a file is retrieved from a disk), registered completion routines are called to perform any additional processing of the data, and the requested data is returned to the user application.

At a higher layer in the core IO system, File IO events record the operations issued by an application. File IO events include the following types: Create, Read, Write, Flush, Rename, Delete, Cleanup, Close, Set Information, Query Information, Directory Enumeration, and Directory Change Notification. Operations such as Create, Read, Write, Flush, Rename and Delete are straightforward, and they contain data items such as file key, IO request packet (IRP) pointer, block size, and offset into the file, as necessary. Set Information and Query Information events indicate that file attributes were set or queried. A Cleanup event is logged when the last handle to the file is closed. A Close event specifies that a file object is being freed. Directory Enumeration and Directory Change Notification events are logged when a directory is enumerated or a directory change notification is sent out to registered listeners, respectively. File IO events are logged to ETW when the operation is requested. Those that are interested in the completion and duration of the file IO operations can enable File IO Completion events, which can be correlated to the original File IO events through IRP pointer. File IO Completion events record IRP pointer and return status.

Disk events are logged at a lower level in the IO stack, and they contain disk-access-specific information. Read and Write operations generate Disk Read and Write events containing disk number, transfer size, byte offset to the address being accessed, IRP pointer, and response time of the access. Flush events record disk flush operations. Unlike File IO events that are logged at the beginning of operations, Disk IO events are logged at the IO completion time. Users have the option to collect additional Disk IO Init events for all Disk IO events (ReadInit, WriteInit and FlushInit events). As mentioned earlier, not all File IO events have matching Disk JO events, if for instance the requested content is already available in the cache or a write to disk operation is buffered. Split IO events indicate that IO requests have been split into multiple disk JO requests due to the underlying mirroring disk hardware. Users without such hardware will not see Split IO events even if they enable them. It maps the original parent IRP into multiple child IRPs.

Disk IO, File IO and Split IO events contain unique file keys created for open files. This file key can be used to track related IO operations within the IO system. However, the actual file name for the file operation is not available in any File or Disk IO events. To resolve the name of the files, File Details events are needed. All open files are enumerated to record their file keys and names. In a simulated state machine, file objects are tracked in terms of file keys, to record file IO requests and actual disk accesses, and then names are updated in the objects when File Details events are encountered. For a historical reason, File Keys in Disk IO and File Details events are named FileObject. Most File IO events contain both file object and file key.

Driver events indicate activities in drivers, which, depending on the device type, may or may not overlap with disk IO activities. Driver events may be of interest to users familiar with the Windows Driver Model (WDM). The driver instrumentation adds events around driver JO function calls and completion routines. Driver events contain driver data such as file key, IRP pointer, and routine addresses (major and minor function and completion routine), as appropriate for individual event types.

IO events usually result in a very large volume of events, which may require increasing the number and/or size of the buffers for the kernel session (-nb option in logman). Also, IO events are useful in analyzing file usages, disk access patterns and driver activities. However, the process and thread id values of the IO events, with the exception of Disk JO events, are not valid. To correlate these activities correctly to the originating thread and thus to the process, one needs to consider tracking Context Switch events.

Suppose the target volume for which we need to take incremental is D: To start off, at time T0, we create and mount a small VHD based dummy volume from the target volume D: which is say E: The choice of the underlying volume for the dummy volume is really not important. It can as well reside on C:\ and/or can also be the system reserved partition.

1. The target volume D: is added to the snapshot set using AddToSnapshotSet VSS API and the default system provider is marked as the one responsible for creating the snapshot.

2. The dummy volume E: is added to the snapshot set using AddToSnapshotSet. and the dummy VSS software provider is marked as the one responsible for creating the snapshot.

3. Create the snapshot using DoSnapshotSet VSS API. The snapshot set initially consisted of two source volumes but only one actual snapshot device will be created. This will be the snapshot of the volume for which the default system VSS provider was marked as the one responsible for taking the snap.

4. Create the base parent VHD of the target volume using its snapshot created in the above snapshotset.

5. The point-in-time for starting change block tracking during the snapshot creation process would be when the CommitSnapshot method for our software provider is called and it is while this function is executing under the context of our dummy VSS provider, that we start ETW tracing. While inside CommitSnapshots, the writes across all volumes that constitute a snapshot set are guaranteed to be frozen. Furthermore, the I/O system is quiescent only while this method is executing. Immediately after the last provider's CommitSnapshots method returns, the VSS service releases all pending writes on the source volume.

6. Once the ETW DiskIO is started, the events corresponding to the target volume's physical disk are filtered and the changed block information is tracked in an in-memory data structure. All write IOs that are tracked from this point on would represent block level changes to the source volume after its snapshot is taken at T0.

7. Now at time T1 another VSS snapshot is taken on similar lines as above. During the second snapshot, the CommitSnapshots method of the dummy VSS provider freezes updates to the currently active changed block map and allocates a new change map which is then used to track writes beyond time T1 and hence becomes the currently active change map. The earlier frozen change block map now represents the block level changes to the volume for the time interval T0 to T1. The incremental backup VHD is then generated using the snapshot taken at T1 and the change block map collected by ETW trace between times T0 to T1. The offsets provided by ETW are in terms of disk offsets. The physical disk offsets of all writes are translated to volume offsets for incremental using IOCTL_VOLUME_PHYSICAL_TO_LOGICAL control code.

Block level backup of CSV volume on windows requires coordination from all participating nodes. CSV volume on non-coordinator nodes do not have a corresponding volume stack as is the case with non-CSV volumes. A write to file residing on a CSV disk is split into two parts. The file's metadata update is intercepted at the file system level by the CSV filesystem minifilter driver and is send over the network to the coordinating node while the actual data to be written is directly sent over to the disk class driver which as we know is the source of ETW disk class events. Block level incremental backup for CSV volumes proceeds in a similar fashion. On the first snapshot request the backing-up node (one initiating the snapshot) sends an RPC request (from inside its CommitSnapshot callback) to all member nodes, directing them to start ETW. Subsequent CommitSnapshot invocations for incremental snapshots would direct all member nodes to switch and freeze the change block map. The final Incremental bitmap is then constructed by merging the CBT bitmaps obtained from all member nodes.

In a CSV setup, all individual member nodes are capable of writing concurrently to the shared CSV volume; at the same time. However only one node, owns the underlying physical disk associated with the CSV volume and is responsible for writing metadata updates received from all member nodes. This node is called the coordinating node. All non-coordinating nodes split the write IO in two parts. Metadata updates are routed to the owner node while non-metadata writes are directly passed on to the local disk class driver. Following are the steps for taking incremental backup of the CSV volume:

At time T0 from the originating node (i.e. the node from where the VSS snapshot is taken), create a snapshot-set consisting of the CSV volume and a dummy volume whose snapshot would be created by the dummy VSS software provider. CommitSnapshot method of the dummy software provider when invoked by the VSS framework at the defined time freezes writes across both the volumes and: a) Starts DiskIO class ETW tracing on the local node and b) Makes an RPC call to a dedicated process running on all member nodes. With a CSV setup the changed block tracking on the originating node can done from inside the VSS provider's hosting process and the RPC call from its CommitSnapshot method would signal the dedicated process on remote nodes to start tracking its respective writes. Writes are reenabled.

At an arbitrary forward time T1 another VSS snapshot is taken on similar lines as above. During the second snapshot, the CommitSnapshots method of the dummy VSS provider on the originating node freezes updates to the currently active changed block map, allocates a new change map and signals the dedicated processes on the remote nodes to do the same i.e. freeze their instance of the currently active change map and allocate a new map which would then be used to track writes happening on their respective nodes.

At the end of the snapshot, the backup application running on the originating node requests all member nodes to furnish their respective changed block map which represents Direct-IO writes that have happened on the CSV volume through their node. CSV volume's incremental backup is then generated using the snapshot taken at T1 and the master change block map generated by performing a bitwise OR on the collected by ETW trace between times T0 to T1 on all individual member nodes. For example, in the case where Change Map of node A--->CMa:0001100000111 and Change Map of node b--->CMb:1100000000001, then the Master change map of the entire CSV: CMa|CMb=1101100000111.

VSS snapshots can either be taken for individual volumes or on a multiple volume basis. Latter is commonly referred to as the "snapshot-set" of multiple volumes. Once created, it contains individual snapshots for all the volumes which VSS initiator had earlier added into the set (prior to triggering the snapshot). While adding a volume to a set, the initiator needs to specify the provider that would be creating the actual snapshot of the volume. Here, VSS framework allows initiator to potentially mark a different VSS provider as the one responsible for creating actual snapshot for that particular volume. The important property of this multiple volume snapshot-set is that, individual resulting snapshots of the corresponding volumes would be frozen at the same point in time. In a volume set where different providers have been marked for individual volumes, VSS framework calls CommitSnapshots( ) method of each responsible providers sequentially, one after the other, to take the logical snapshot for its corresponding volume/LUN. VSS framework guarantees that while the CommitSnapshots( ) method of each provider are being invoked sequentially, writes across all volumes, in the set, would be frozen.

The use of a dummy volume and the corresponding dummy provider in this disclosure is to programmatically enter the VSS state machine at the defined time when, writes across all constituent volumes in the set would be frozen. In a multi-volume snapshot set, the backup application (initiator) would add all the volumes, one by one to the set and mark the default system provider as the one responsible for taking the snap. Then it would add the dummy volume to this set and mark the dummy VSS provider as the one responsible for creating its snapshot. The CommitSnapshot( ) method of system provider would create the actual software snapshots of the corresponding volumes whereas the CommitSnapshot( ) method of our provider would; instead of creating any logical snapshot, freeze updating the bitmap used for tracking writes to the other volumes in the set from time T:n to T:n+m. This is functionally equivalent to what happens if make use of a kernel mode filter driver. The Filter driver monitors IOCTL_VOLSNAP_FLUSH_AND_HOLD_WRITES and freezes the change block tracking bitmap for a particular volume. The frozen bitmap now represents the block level incremental changes to the volume for the time interval T:n to T:n+m. In the VSS state machine diagram, note that CommitSnapshot( ) methods of the providers are invoked by the VSS framework in the user mode only AFTER it send IOCTL_VOLSNAP_FLUSH_AND_HOLD_WRITES to the kernel and it is only after ALL the CommitSnapshots( ) methods have executed that the writes on the volumes are released (IOCTL_VOLSNAP_RELEASE_WRITES).

Therefore, from a functional perspective there are only two things that are required for taking block level incremental backups at either kernel level or in user mode. Kernel mode filter driver: (1) Ability to get real-time information on where writes are happening on the volumes—By placing itself directly in the path to write IO as it goes down the volume device stack. (2) Ability to define the point in time for consistent backups. By intercepting IOCTL_VOLSNAP_FLUSH_AND_HOLD_WRITES and then freezing the changed block tracking bitmap. User mode: (1) Ability to get real-time information on where writes are happening on the volumes—By using DiskIO ETW events in real time mode. (2) Ability to define the point in time for consistent backups. Becoming part of VSS state machine by using a VSS provider that freezes the bitmap of other volumes from its CommitSnapshot( ).

The Shadow Copy Creation Process A requester is the application that initiates the request to create a shadow copy. Typically the requester is a backup application. As necessary, VSS will call the providers involved. Most providers are interested in three specific requests from the requester.

1. The requester begins the shadow copy creation activity with a call to IVssBackupComponents::StartSnapshotSet. This generates a GUID of type VSS_ID that uniquely identifies this specific shadow copy set—the SnapshotSetId. The provider is not involved in this step, but the SnapshotSetId is used extensively in all subsequent steps.
2. For each volume it wishes to include in this shadow copy set, the requester calls IVssBackupComponents::AddToSnapshotSet. VSS determines which provider will be used to shadow copy the volume.
    Multiple providers may participate in a shadow copy set. For example, if the system volume and a data volume are part of the same shadow copy set, the system provider may serve as the shadow copy provider for the system volume while a hardware provider may serve as the shadow copy provider for the data volume. Both providers would be part of the same shadow copy set and the user would expect the same point-in-time consistency across both volumes.
    For a hardware provider to be selected, the hardware provider must be able to support all LUNs contributing to the specified volume.
    All registered providers are given the opportunity to indicate support for a given volume during shadow copy creation. If more than one provider indicates support, VSS will first default to hardware providers, then software providers, and finally the system provider (if no other provider indicates support for that volume).
    A requester may override this default order by explicitly indicating the provider it requires to create the shadow copy.
    If there are multiple hardware providers that support a given volume, there is no guarantee to the order in which the hardware providers will be called.
3. After one or more calls to AddToSnapshotSet, the requester can ask for the shadow copy to be created by using the IVssBackupComponents::DoSnapshotSet method. VSS then works with the system to create the shadow copy. The DoSnapshotSet method performs this work asynchronously, and the requester can either poll or wait for the shadow copy creation process to complete.

Figure 4:
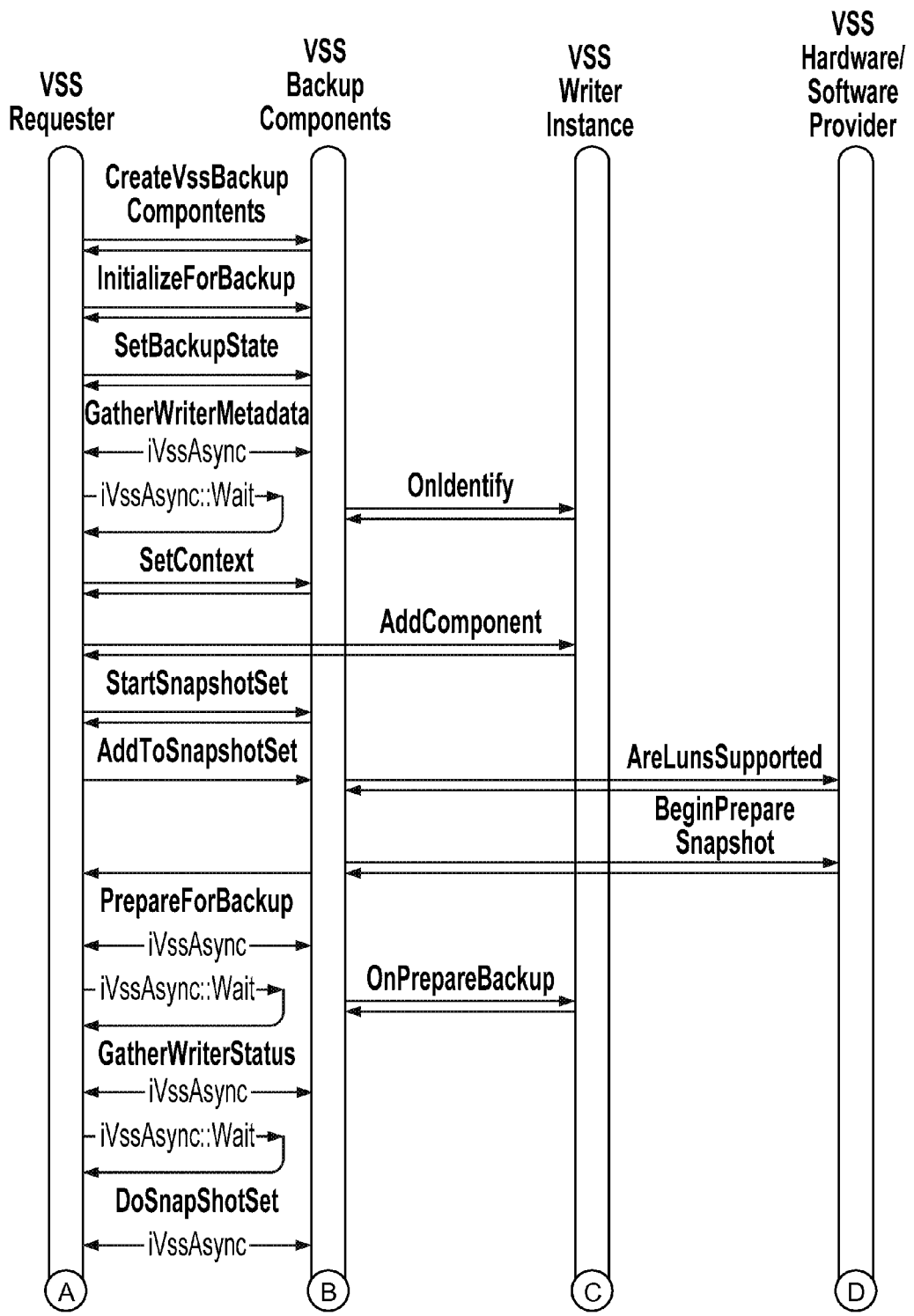
FIG. 4 is a block diagram illustrating an embodiment of the interactions between the requester, the VSS service, the VSS kernel support, any VSS writers involved, and any VSS hardware providers.
Figure 4:
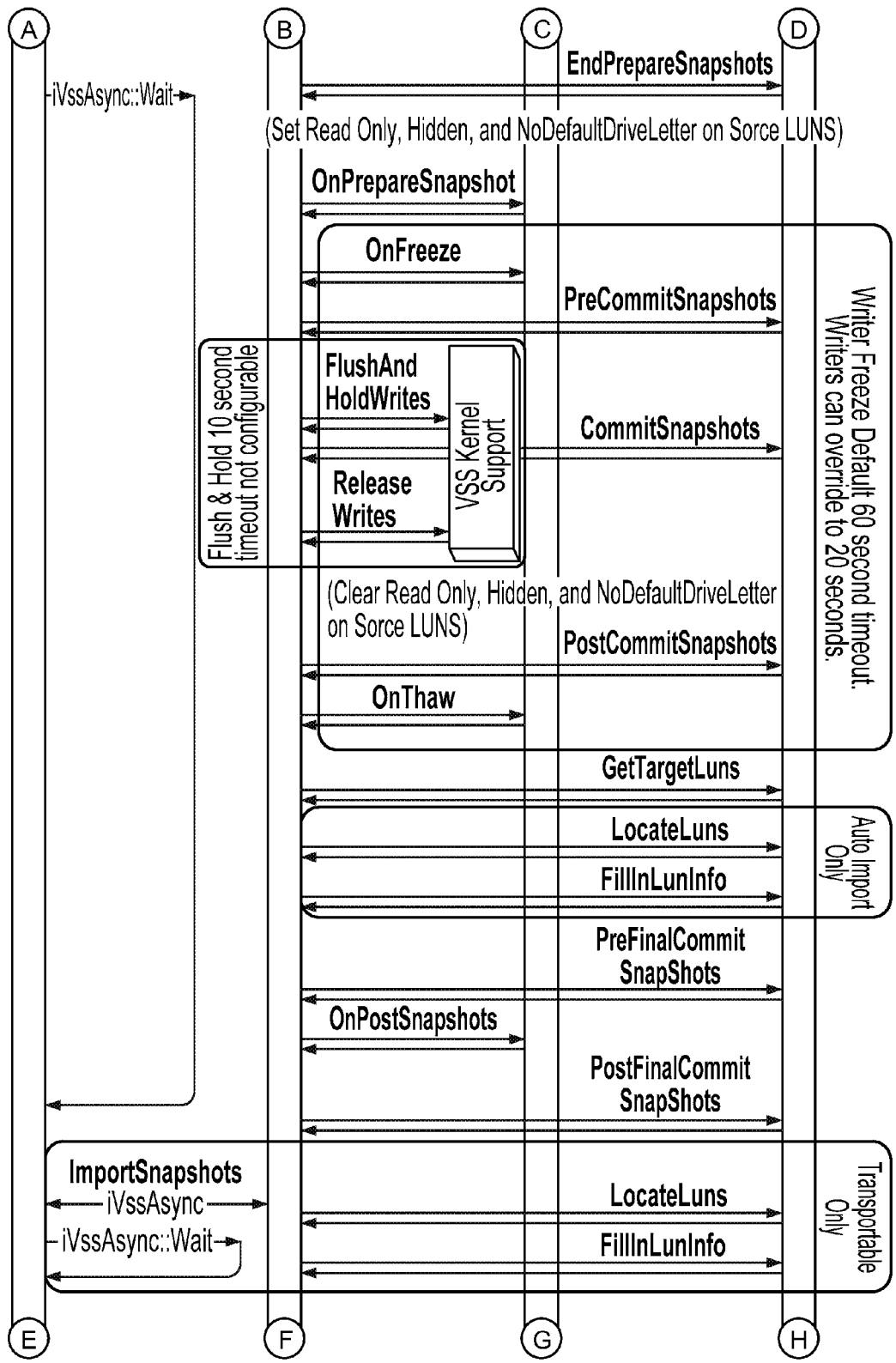
Figure 4:
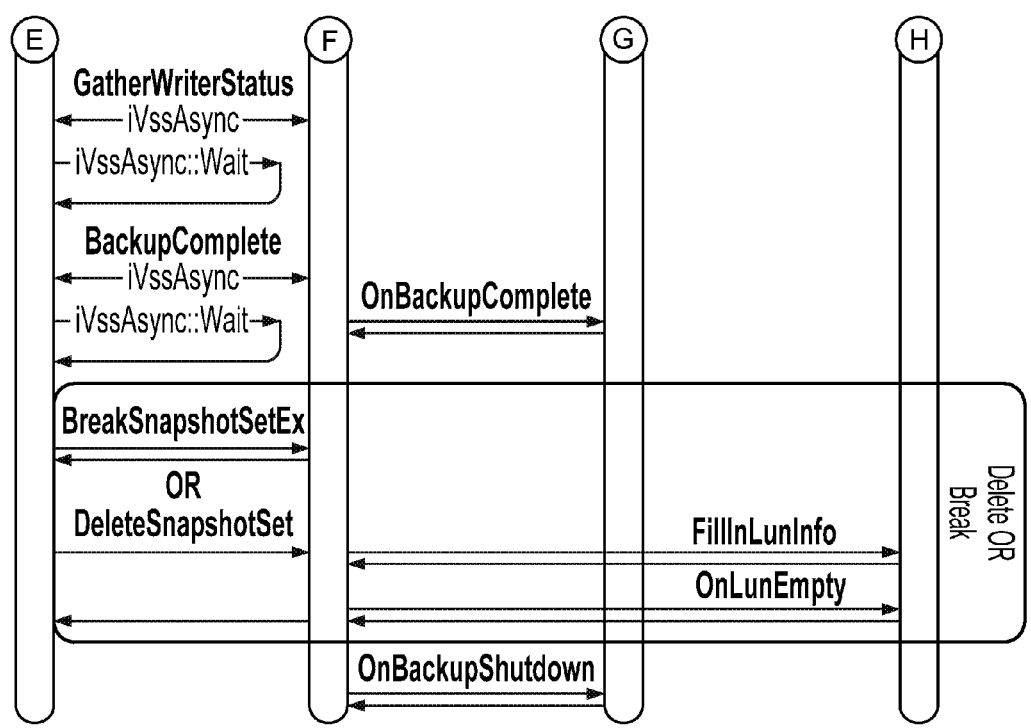

FIG. 4 is a block diagram illustrating an embodiment of the interactions between the requester, the VSS service, the VSS kernel support, any VSS writers involved, and any VSS hardware providers. See The Shadow Copy Creation Process for a detailed description of these interactions.

When the shadow copy creation process is complete, the requester can determine if the shadow copy creation was successful, and if not, determine the source of the failure. The time interval between the freeze and thaw of the writer applications must be minimized. Provider must asynchronously start all preparation work related to the shadow copy (such as a hardware provider that uses plexes starting the synchronization) in the IVssHardwareSnapshotProvider::BeginPrepareSnapshot method, and then wait for the completions in the IVssProviderCreateSnapshotSet::EndPrepareSnapshots method.

There are multiple timing limit windows that providers must follow. As a result, well-behaved providers will perform all unnecessary processing before IVssProviderCreateSnapshotSet::PreCommitSnapshots and after IVssProviderCreateSnapshotSet::PostCommitSnapshots. The shadow copy set is fixed when DoSnapshotSet is called. Additional volumes cannot be added later because the additional volumes would not share the same point-in-time.

Point-in-Time for Writerless Applications

VSS includes special support that defines the point-in-time that is common for all volumes in a shadow copy set. Hardware providers do not need to directly interface with these kernel technologies, since they are invoked as part of the normal shadow copy commit processing. However, it is useful to understand the mechanisms used because it explains the definition of 'point-in-time' for writerless applications (applications that have not exposed a VSS Writer interface and therefore do not participate in the volume shadow copy creation process.) This VSS kernel support for common point-in-time is distributed between the VolSnap.sys driver, the file systems, and VSS.

1. Before the VSS kernel support is invoked, VSS has already:
    1. Determined which volumes are to be involved in the shadow copy.
    2. Determined which provider is to be used on each volume.
    3. Frozen applications that are accepting freeze/thaw messages.
    4. Prepared the providers for the shadow copy by calling the PreCommitSnapshots methods. All providers are now waiting to do the actual shadow copy creation.

2. The point-in-time is then created. VSS concurrently flushes the file systems on all of the volumes that are to be shadow copied.
   1. VSS issues an IOCTL_VOLSNAP_FLUSH_AND_HOLD_WRITES control command on each volume that flushes the file systems. That IOCTL is passed down the storage stack to VolSnap.sys. VolSnap.sys then holds all write IRPs until step 4 below. Any file system (such as RAW) without support for this new IOCTL passes the unknown IOCTL down—where it is again held by VolSnap.sys. On NTFS volumes, the flush also commits the NTFS log.
   2. This suspends all NTFS/FAT metadata activity; the file system metadata is cleanly committed.
   3. The shadow copy instant: VolSnap.sys causes all subsequent write IRPs to be queued on all of the volumes that are to be shadow copied.
   4. VolSnap.sys waits for all pending writes on the shadow copied volumes to complete. The volumes are now quiescent with respect to writes, and were quiescent at exactly the same moment on each volume. There are no guarantees about writes to user mapped sections or writes issued between (a) and (b) on file systems that do not implement the flush IOCTL (e.g. RAW).
3. VSS instructs each provider to take in the shadow copy by calling the IVssProviderCreateSnapshotSet::CommitSnapshots methods. The providers should have all preparation done so that this is a quick operation.
   Note that the I/O system is quiescent only while these CommitSnapshots methods are executing. If a provider performs any synchronization of the source and shadow copy LUNs, this synchronization must be completed before the provider's CommitSnapshots method returns. It cannot be performed asynchronously.
4. Immediately after the last provider's CommitSnapshots method returns, VSS releases all pending write IRPs (including the IRPs that were blocking the file systems at the conclusion of their commit paths) by invoking another IRP passed to VolSnap.sys.
5. If the shadow copy process was successful, then VSS now:
   1. Calls PostCommitSnapshots for the providers involved.
   2. Calls CVssWriter::OnThaw for the writers involved.
   3. Informs the requester that the shadow copy process has completed.

PreCommitSnapshots, CommitSnapshots, to PostCommitSnapshots are all time critical. All I/O from applications with writers is frozen from PreCommitSnapshots to PostCommitSnapshots; any delays affect application availability. All file I/O, including writerless application I/O, is suspended during CommitSnapshots.

Providers should complete all time-critical work prior to returning from EndPrepareSnapshots.

CommitSnapshots should be returned within seconds. The CommitSnapshots phase is located within the Flush and Hold window. VSS kernel support will cancel the Flush and Hold that is holding the I/O if the subsequent release is not received within 10 seconds, and VSS will fail the shadow copy creation process. Other activities will be happening on the system, so a provider should not rely on having the full 10 seconds. The provider should not call Win32 APIs during commit as many will result in unexpected writes and block. If the provider takes more than a few seconds to complete the call, there is a high probability that this will fail.

The full sequence from PreCommitSnapshots to the return of PostCommitSnapshots maps to the window between writers receiving the Freeze and Thaw events. The writer default for this window is 60 seconds, but a writer may override this value with a smaller timeout. For example, the Microsoft Exchange Server writer changes the timeout to 20 seconds. Providers should not spend more than a second or two in this method.

During CommitSnapshots the provider must avoid any non-paging file I/O; such I/O has a very high probability of deadlocking. In particular, the provider should not synchronously write any debug or trace logs.

Selecting Providers

A requester should select a specific provider only if it has some information about the providers available. Because this will not generally be the case, it is recommended that a requester supply GUID_NULL as a provider ID to IVssBackupComponents::AddToSnapshotSet, which allows the system to choose a provider according to the following algorithm:
   1. If a hardware provider that supports the given volume is available, it is selected.
   2. If no hardware provider is available, then if any software provider specific to the given volume is available, it is selected.
   3. If no hardware provider and no software provider specific to the volumes is available, the system provider is selected.

However, a requester can obtain information about available providers by using IVssBackupComponents::Query. With this information, and only if the backup application has a good understanding of the various providers, a requester can supply a valid provider ID to IVssBackupComponents::AddToSnapshotSet. Note that all volumes do not need to have the same provider.

IVssProviderCreateSnapshotSet::CommitSnapshots Method

The CommitSnapshots method quickly commits all LUNs in this provider. The syntax is as follows:
   HRESULT CommitSnapshots(
   [in] VSS_ID SnapshotSetId
   );
where SnapshotSetId [in] is the VSS_ID that identifies the shadow copy set. If any other value is returned, VSS will write an event to the event log and convert the error to VSS_E_UNEXPECTED_PROVIDER_ERROR. This method is called at the defined time at which the shadow copies should be taken. For each prepared LUN in this shadow copy set, the provider will perform the work required to persist the point-in-time LUN contents. While this method is executing, both applications and the I/O subsystem are largely quiescent. The provider must minimize the amount of time spent in this method. As a general rule, this method should take less than one second to complete. This method is called during the Flush and Hold window, and VSS Kernel Support will cancel the Flush and Hold if the release is not received within 10 seconds, which would cause VSS to fail the shadow copy creation process. If each provider takes more than a second or two to complete this call, there is a high probability that the entire shadow copy creation will fail. Because the I/O system is quiescent, the provider must take care to not initiate any I/O as it could deadlock the system—for example debug or tracing I/O by this method or any calls made from this method. Memory mapped files and paging I/O will not be frozen at this time. Note that the I/O system is quiescent only while this method is executing. Immediately after the last provider's CommitSnapshots method returns, the VSS service releases all pending writes on the source LUNs. If the provider performs any synchronization of the source and shadow copy LUNs, this synchronization must be completed before the provider's CommitSnapshots method returns; it cannot be performed asynchronously.

Figure 5:
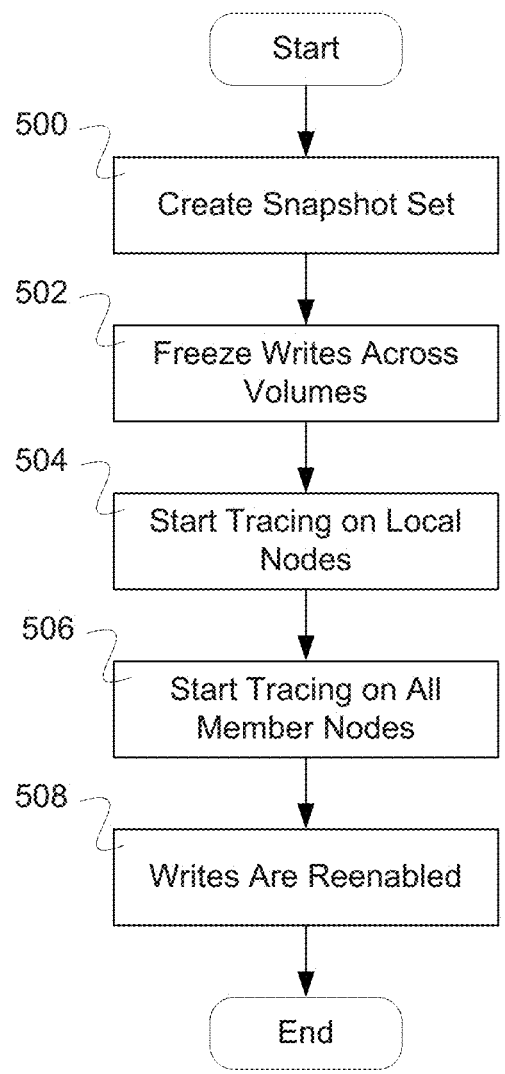
FIG. 5 is a flow diagram illustrating an embodiment of a process for incremental backups of a CSV volume.

FIG. 5 is a flow diagram illustrating an embodiment of a process for incremental backups of a CSV volume. In the example shown, in 500 a snapshot set is created. For example, a CSV volume and a dummy volume are created. In 502, writes are frozen across volumes. In 504, tracing is started on local nodes. In 506, tracing is started on all member nodes. In 508, writes are reenabled. For example, a map for changed blocks is generated using the tracing of writes on each node including a local node and all non-local nodes. A total changed block map includes contributions from all of the nodes (e.g., local and non-local nodes).

Figure 6:
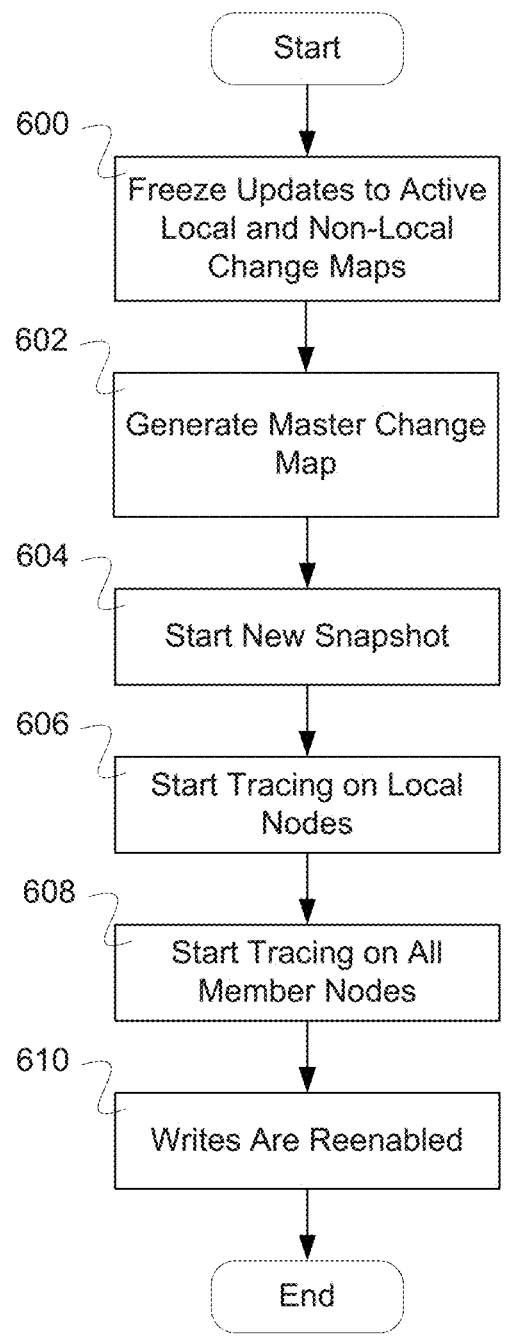
FIG. 6 is a flow diagram illustrating an embodiment of a process for incremental backups of a CSV volume.

FIG. 6 is a flow diagram illustrating an embodiment of a process for incremental backups of a CSV volume. In the example shown, in 600 updates to active local and non-local change maps are frozen. In 602, a master change map is generated. For example, the change maps from all nodes are OR'ed together. In 604, a new snapshot is started. In 606, tracing on local nodes is started. In 608, tracing on all member nodes is started. In 610, writes are reenabled. For example, a new snapshot is initiated. The new snapshot initiation freezes the previous change map tracing. The change maps from all nodes are consolidated to generate a master change map, where the writes initiated on all nodes are considered. A new change map is started on local and non-local nodes. The writes are reenabled across all nodes.

Figure 7:
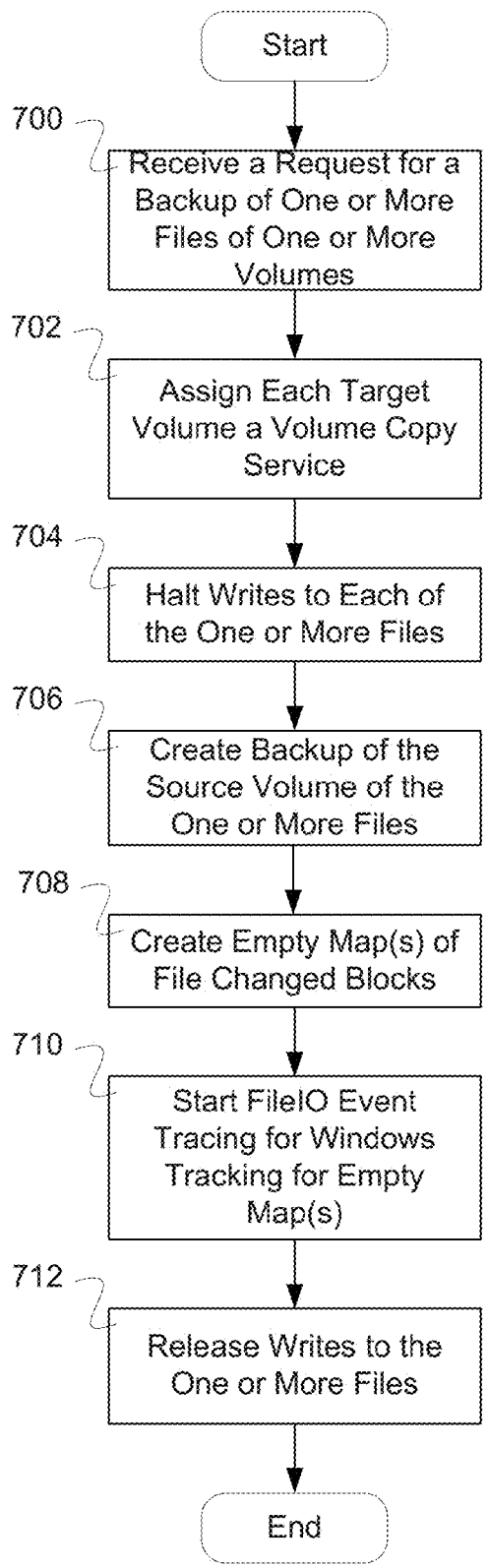
FIG. 7 is a flow diagram illustrating an embodiment of a process for incremental backups with fileIO class ETW tracing.

FIG. 7 is a flow diagram illustrating an embodiment of a process for incremental backups with fileIO class ETW tracing. In the example shown, in 700 a request is received for to incrementally backup one or more files of one or more volumes. In 702, a target volume is assigned for each of the one or more volumes. In 704, writes to each of the one or more files is halted. In 706, a backup set is created of the source volume of the one or more files. For example, at time T0, a backup set is created of the source volume that hosts the one or more files which is to be incrementally backed up, and a dummy volume is created by the dummy VSS software provider. In 708, an empty map of file changed blocks is created. In 710, FileIO class ETW tracing is started. For example, a CommitSnapshot method of the dummy software provider is invoked by the VSS framework to start FileIO class ETW tracing, and at the defined time writes across both the volumes are frozen. In some embodiments, writes are tracked using one or more change block maps. For example, real time consumption of the FileIO class events from inside CommitSnapshot method of the dummy software provider triggers changed block tracking at the file system level which allows trace consumer to track writes happening on a per file basis. Once FileIO class ETW tracing starts, the backup application starts updating the change block map of the specific file for a given node; one which is supposed to be incrementally backed up. Change block maps from all nodes are aggregated (e.g., OR'ed) to determine a master change block map for the file. FileIO events which do not correspond to the target file are excluded from file level change block tracking. This map records the file level offsets for blocks of all subsequent writes happening to the file after the first snapshot is taken. The first full file backup of the file is generated using the snapshot created at time T0, the file is backed up from block offset 0 till the end block by using BackupRead API against the file present on the frozen point in time snapshot and Backup Write API to write the file's stream to the backup server. Note that the tracking is done at the block level not at a higher level (e.g., blocks not higher level pointers). In 712, writes to the one or more files are released.

Figure 8:
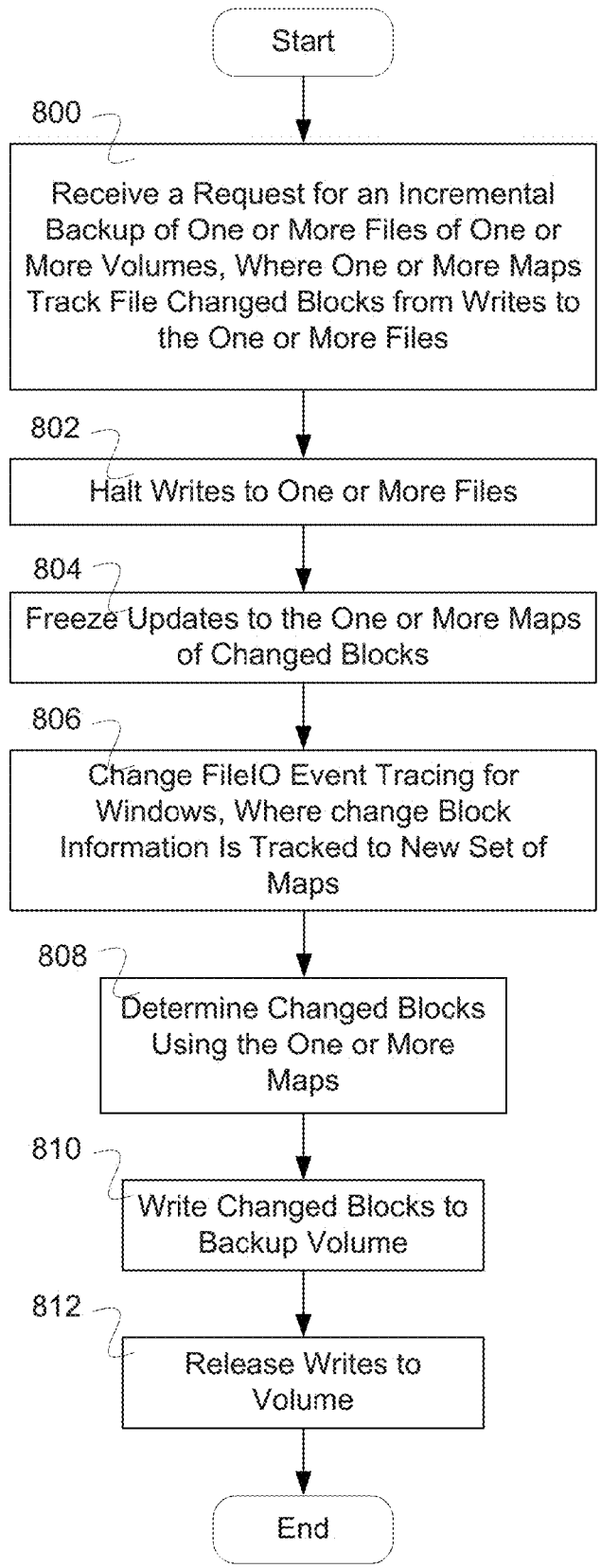
FIG. 8 is a flow diagram illustrating an embodiment of process for incremental backups with fileIO class ETW tracing.

FIG. 8 is a flow diagram illustrating an embodiment of process for incremental backups with fileIO class ETW tracing. In the example shown, in 800, a request is received to incrementally backup one or more files of one or more volumes, where one or more maps track file changed blocks from writes to the one or more files. For example, at an arbitrary time T1 subsequent time to T0 another VSS snapshot is taken on similar lines as in FIG. 7. In 802, writes to the one or more files are halted. In 804, updates to the one or more changed block maps are frozen. In 806, fileIO Event Tracing for Windows is changed, where file change block information is tracked to a new set of maps. For example, a new set of change maps is designated for new writes. In 808, file changed blocks are determined using the one or more maps. For example, the one or more maps are OR'ed together to indicate the changed files including changes from one or more nodes. In 810, file changed blocks are written to backup volume. In 812, the one or more files are released for writes.

In some embodiments, during the second snapshot, the CommitSnapshots method of the dummy VSS provider freezes updates to the currently active changed block maps of the file and allocates a new set change maps corresponding to the nodes of the system, which are then used to track writes happening on the file beyond time T1. The new set of change maps become the currently active change maps of the file which is being incrementally backed up. The earlier frozen change block maps now represent the changes to the file for the time interval T0 to T1. The incremental file backup of the file is then generated using the snapshot taken at T1 and the file level change block maps collected by ETW trace (e.g., a map for each node of the system) between times T0 to T1. For incremental backup at time T2, the frozen file on snapshot created at T2 is opened and only those file blocks which as per the file's changed block map collected between the interval T0-T1 are backed up.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for incremental backup, comprising:
    a storage device, wherein the storage device comprises one or more volumes;
    a processor configured to:
        start fileIO Event Tracing for Windows tracking, wherein a file changed block info is tracked in one or more maps, wherein each of the one or more maps tracks writes indicated via a node of a set of nodes;
        receive request for an incremental backup of one or more files of one or more volumes, wherein the one or more maps track changed blocks from writes to the one or more files;
        halt writes to the one or more files and queue writes to the one or more files after halting;
        freeze the one or more maps of changed blocks;
        change fileIO Event Tracing for Windows tracking, wherein the change block information is tracked to a new set of maps;
        determine changed blocks using the one or more maps;
        write changed blocks to a backup volume;
        release writes to the one or more files; and
    a memory coupled to the processor and configured to provide the processor with instructions.

2. A system as in claim 1, wherein a volume of the one or more volumes comprises a virtual hard disc.

3. A system as in claim 1, wherein writing changed blocks to the backup volume comprises writing the changed blocks using a volume shadow copy service.

4. A system as in claim 1, wherein the fileIO Event Tracing for Windows tracking comprises filtering for data write events.

5. A system as in claim 1, wherein a backup time is written.

6. A system as in claim 5, wherein the backup time comprises one of the following: a start time of the backup, a completed time of the backup, or a midpoint time of the backup.

7. A system as in claim 1, wherein the volume of the one or more volumes comprises a dummy source volume.

8. A system as in claim 7, wherein a dummy volume copy service provider creates a copy of the dummy source volume.

9. A system as in claim 1, wherein the processor is further configured to invoke an IsVolumeSupported method.

10. A system as in claim 1, wherein the processor is further configured to determine whether the changed block info is outside a target boundary.

11. A system as in claim 10, wherein the processor is further configured to exclude the changed block info from the one or more maps.

12. A system as in claim 1, wherein determining the changed blocks comprises or'ing the one or more maps to generate a master map.

13. A system as in claim 12, wherein the master map is used for incrementally backing up the volume.

14. A system as in claim 1, wherein tracking on one or more maps comprises tracking on each of the set of nodes.

15. A method of incremental backup, comprising:
  starting fileIO Event Tracing for Windows tracking, wherein a file changed block info is tracked in one or more maps, wherein each of the one or more maps tracks writes indicated via a node of a set of nodes;
  receiving request for an incremental backup of one or more files of one or more volumes, wherein the one or more maps track changed blocks from writes to the one or more files;
  halting writes to the one or more files and queue writes to the one or more files after halting;
  freezing the one or more maps of changed blocks;
  changing file IO Event Tracing for Windows tracking, wherein the change block information is tracked to a new set of maps;
  determining changed blocks using the one or more maps;
  writing changed blocks to a backup volume;
  releasing writes to the one or more files.

16. A computer program product for incremental backup, the computer program product being embodied in a non-transitory computer readable storage medium and comprising computer instructions for:
  starting fileIO Event Tracing for Windows tracking, wherein a file changed block info is tracked in one or more maps, wherein each of the one or more maps tracks writes indicated via a node of a set of nodes;
  receiving request for an incremental backup of one or more files of one or more volumes, wherein the one or more maps track changed blocks from writes to the one or more files;
  halting writes to the one or more files and queue writes to the one or more files after halting;
  freezing the one or more maps of changed blocks;
  changing file IO Event Tracing for Windows tracking, wherein the change block information is tracked to a new set of maps;
  determining changed blocks using the one or more maps;
  writing changed blocks to a backup volume;
  releasing writes to the one or more files.

\* \* \* \* \*